Nov. 17, 1970  A. COLE III  3,541,023

PORTABLE FOAMING SYSTEM

Original Filed March 11, 1963

INVENTOR.
AUSTIN COLE III
BY Elliott & Pastoriza
ATTORNEYS

United States Patent Office 3,541,023
Patented Nov. 17, 1970

3,541,023
PORTABLE FOAMING SYSTEM
Austin Cole III, Santa Monica, Calif., assignor, by mesne assignments, to Olin Corporation, a corporation of Virginia
Continuation of application Ser. No. 264,419, Mar. 11, 1963. Division of application Ser. No. 450,242, Apr. 13, 1965. This application Feb. 23, 1968, Ser. No. 729,840
Int. Cl. B01j 2/04
U.S. Cl. 252—359          3 Claims

ABSTRACT OF THE DISCLOSURE

The apparatus for generating urethane foam which comprises:
(a) preparing a pre-polymer solution by incorporating toluene diisocyanate in an expanding agent in the form of a gas in liquid state,
(b) preparing a resin solution comprised of a glycol incorporated in an expanding agent in the form of a gas in liquid state,
(c) pressurizing pre-polymer (a) and resin solution (b),
(d) placing the pressurized pre-polymer (a) and resin solution (b) into a static mixing chamber at a constant flow and at a constant ratio whereby said expanding agent expands to form a gas which lathers the reaction product of pre-polymer (a) and resin (b) to form a urethane foam, and
(e) expressing the urethane foam from an outlet nozzle secured to the mixing head.

---

The present application is a division of copending application, Serial No. 450,242, filed Apr. 13, 1965, by Austin Cole III now abandoned.

This application is a continuation of my copending application Serial No. 264,419, filed Mar. 11, 1963 and entitled Portable Foaming Apparatus now abandoned.

This invention relates to a novel portable foaming system capable of mixing prepolymers and resin materials automatically in proper ratio for generating foam directly at the site in which the foam is to be used.

The present invention constitutes an improved system over that shown and described in my copending patent application Serial No. 194,903, filed May 15, 1962, and entitled Portable Foam Generating Apparatus, now United States Patent No. 3,178,157. In my copending application, there is described a portable foaming apparatus including novel storage means for the two basic materials to be mixed together in generating the foam. Briefly, the storage means comprise separate containers incorporating polyethylene bags within which the material is stored. Suitable pressure is applied to the exterior of these bags so that the contents within the bags are expelled through respective metering type position displacement flow control means which are geared together so that the outputs from these flow control means are always in a constant ratio. The material from the respective flow control means passes through a mixing head to provide the foam.

All of the various advantages and objects of the invention as set forth in my above referred to copending application are applicable to the instant invention. In this respect, the instant invention contemplates the provision of a small, compact, and efficient foam generating means in which adequate pressure is available, adequate storage is provided for the separate materials to be mixed, and in which proper proportions of the materials can be realized.

More particularly, a primary object of the present invention is to provide a portable foam generating apparatus in which improved flow control means are provided so that positive displacement flow control units geared together may be eliminated.

Another object is to provide a foaming apparatus in which the materials themselves are of such a nature that no mechanical mixing is necessary in the mixing head to the end that a greatly simplified mixing head structure may be used.

A more specific object of this invention is to provide in combination with a portable foam generating apparatus a novel flow control unit for use with each ingredient used in the foam to insure a constant flow condition regardless of pressure changes at either the inlet or outlet openings of the unit with the result that a high degree of accuracy in maintaining fixed ratios between the various materials is possible.

Briefly, these and many other objects and advantages of this invention are attained by providing a spray head incorporating a static mixing chamber. This mixing chamber has first and second inlets for receiving materials from first and second storage tanks. Interposed between these tanks and the first and second inlets for the mixing chamber are novel flow control units which will insure constant flow of material from the respective tanks in a desired fixed ratio. The units themselves incorporate means enabling the adjustment of the flow to any desired constant rate so that the proportions may readily be varied.

The invention further contemplates novel mixtures making up the respective materials employed for generating the foam so that a static mixing chamber may be used, and no mechanical agitation is necessary. The resulting portable foaming apparatus is thus compact, reliable in operation, very easy to use by unskilled personnel and highly effective in actual operation.

A better understanding of the invention as well as further features and advantages thereof will be had by now referring to one embodiment thereof as illustrated in the accompanying drawings, in which.

Figure 1:
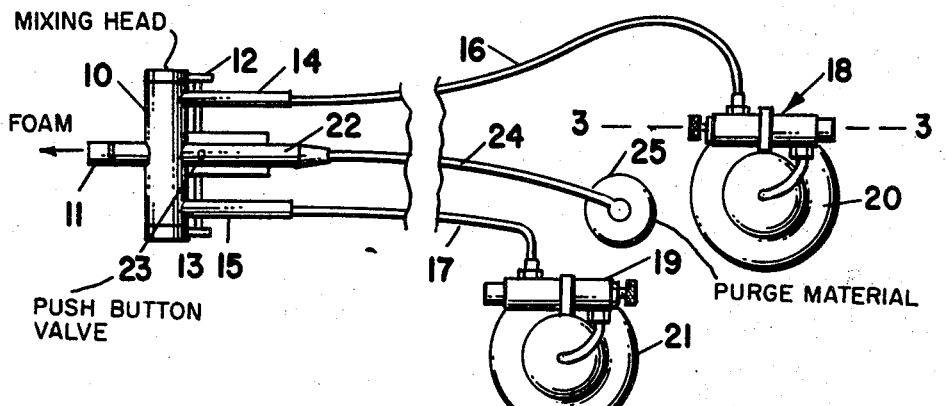
FIG. 1 is a top plan view showing the basic components making up the complete portable foam apparatus.

Referring first to FIG. 1, there is shown a mixing head 10 provided with an outlet nozzle 11 from which foam will be expressed when the apparatus is operated. As shown, the mixing head 10 is provided with first and second valve controls 12 and 13 for admitting or closing off first and second materials received in inlets 14 and 15. These materials are passed to the inlets 14 and 15 through flexible tubes 16 and 17 passing from the outlets of first and second flow control units 18 and 19. These flow control units in turn are connected to receive materials from storage tanks 20 and 21. The mixing head 10 may also include a flushing inlet structure 22 with an on-off push button type valve 23 for receiving flushing material through a line 24 connected to a flushing material source tank 25.

The mixing head 10 incorporates a chamber in which the first and second materials received in the inlets 14 and 15 are mixed together. In the preferred embodiment of the invention, material passed into the inlet 14 constitutes a polymer such as toluene di-isocyanate together with Freon 11 and Freon 12. The second inlet 15 in turn is arranged to receive a resin together with Freon 12. The Freon 12 expands in the static mixing chamber of the mixing head 10 to lather the resin and pre-polymer in both instances and effect the desired mixing so that no mechanical agitation is required. An important feature of this invention thus includes the provision of Freon 12 in both the first and second materials so that mechanical agitation of the materials is unnecessary.

Figure 2:
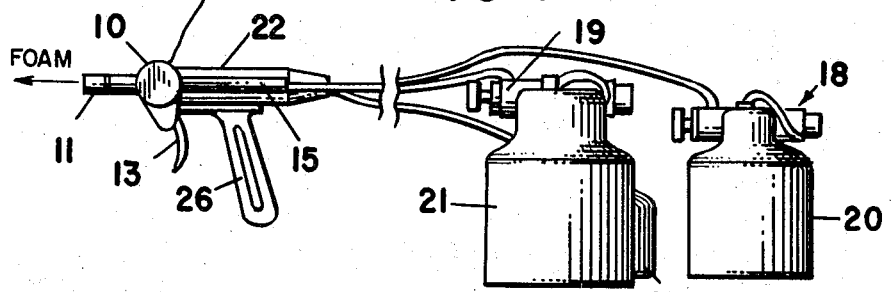
FIG. 2 is a side elevational view of the components illustrated in FIG. 1.

In FIG. 2, the various components of FIG. 1 are shown in side elevation wherein it will be noted that the mixing head structure 10 is provided with a convenient pistol type grip 26 to enable a person to operate the valves 12 and 13. Preferably, the valve operating triggers are either ganged together or disposed close to each other so that they may be operated simultaneously with one finger. The various tanks include a compressed gas so that the materials therein will be expelled under pressure. Any variation of this pressure as the materials are used will be compensated for insofar as maintaining a constant flow rate is concerned by the flow control units 18 and 19 as will become clearer as the description proceeds.

In the overall operation of the components described thus far, a user need first only direct the mixing head nozzle 11 towards an area in which it is desired to deposit foam. Such an area may exist between the forms for a wall, in a mold, or even in an inflatable flexible object to provide a large buoyant mass. With the nozzle thus properly directed, the operator will then operate both the valves 12 and 13 simultaneously to permit materials passing into the inlets 14 and 15 to mix in the mixing chamber 10. The resulting foam will then be expressed under pressure from the nozzle 11 for the required purpose. Release of the valves 12 and 13 automatically shuts off flow through the inlet openings 14 and 15.

After a foaming operation has been completed, the operator may depress the valve button 23 so that flushing material will pass through the line 24 to the inlet 22 and flush out the contents or remnants of materials within the mixing chamber structure 10. This flushing material may comprise methylene chloride. Release of the push button valve control 23 will cut off flow of the flushing material.

Figure 3:
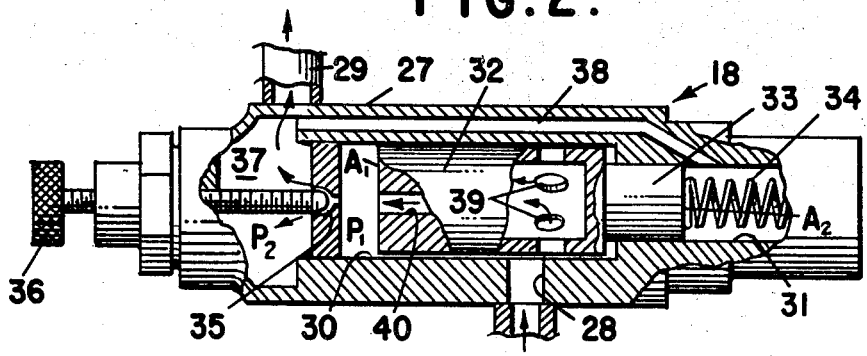
FIG. 3 is an enlarged view partly broken away and partly in cross-section of one of the flow control units looking normally into the plane of the drawing along the lines 3—3 of FIG. 1; and, FIG. 4 is a view similar to FIG. 3, but with the conditions as they would exist when a change in flow rate is effected.
Figure 4:
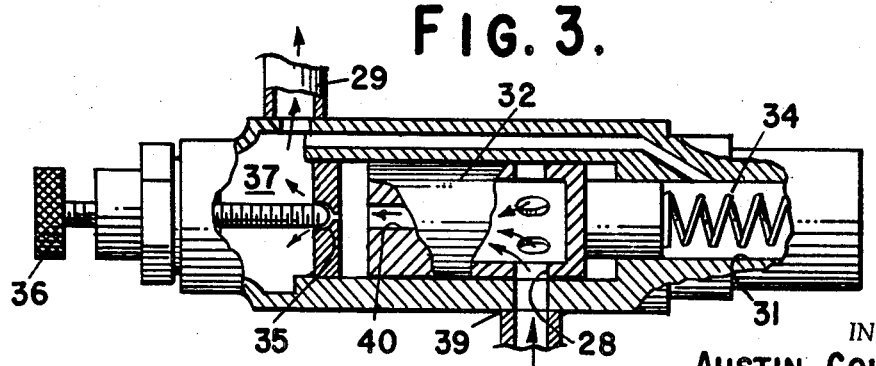

Referring now to FIGS. 3 and 4, the operation of the novel flow control units for the respective materials passed through the lines 16 and 17 will be described. Since these units are identical, description of one will suffice for both.

Referring first to FIG. 3, the unit includes a casing 27 having inlet and outlet openings 28 and 29 disposed adjacent opposite ends of the casing. The interior of the casing includes a cylinder defining a first interior chamber 30. This chamber includes a reduced diameter portion 31 at its righthand end as shown. A plunger 32 in turn is arranged to move within the cylinder chamber 30 and also includes a reduced diameter plunger portion 33 receivable within the reduced diameter chamber portion 31. Plunger 33 is biased to the left by a spring 34.

The other end of the cylindrical chamber 30 terminates in a needle valve means including a needle valve seat 35 and needle valve head screw 36. This needle valve means separates the cylindrical chamber 30 from an outlet chamber 37 which communicates through a passage 38 in the casing 27 to the righthand reduced diameter chamber 31. The plunger 32 includes inlet openings 39 communicating with a central bore 40 for passing material received in the inlet 28 through the needle valve structure to the outlet chamber 37 and thence out the outlet 29. The passage 38 serves to provide a fluid pressure on the righthand end of the reduced diameter portion 33 of the plunger 32 corresponding to the pressure in the outlet chamber 37. A small air bleeder passage 41 extends from between the right hand of the plunger 32 and the shoulder defined by the reduced diameter chamber portion 31 to atmosphere.

In the operation of the flow control unit shown in FIGS. 3 and 4, material will pass into the inlet 28 and through the openings 39 of the plunger 32 and thence down the central bore 40 and through the needle valve structure 35 to the outlet chamber 37. The material will then pass through the outlet 29 to the mixing head structures described in conjunction with FIG. 1. The plunger 32 is longitudinally movable within the cylindrical chamber 30 such that movement, for example to the left as viewed in FIG. 3, will increase the effective size of the inlet opening in view of a more complete registration of the inlet opening 28 with the openings 39 when these openings are moved from partial eclipsing conditions. It will accordingly be clear that the longitudinal position of the plunger 32 will determine effectively the amount of flow of material through the inlet opening 28.

The pressure drop of material across the needle valve structure 35 is effectively applied to opposite ends of the plunger 32. This is accomplished by the passage 38. Thus, if the inlet pressure from the inlet opening 28 of the fluid passing through the plunger and bore 40 is designated P1 on the right hand side of the needle valve structure, and the outlet pressure in the outlet chamber 37 is designated P2, the pressure P1 will be acting on the left face of the plunger 32 or the area A1. The pressure P2 on the other hand will be communicated through the passage 38 to act on the righthand area A2 of the plunger portion 33.

Since the latter area A2 is smaller than the area A1, if the pressures P1 and P2 were equal and there was no pressure drop across the needle valve structure, the plunger 32 will tend to move to the right. However, the spring 34 exerts a biasing force on the plunger 32 to the left as shown. As a consequence and when a pressure drop exists across the needle valve structure, an equilibrium condition is established for the position of the plunger 32 within the cylindrical chamber 30. For a given setting of the needle valve 35, this equilibrium position will result in a constant flow of material regardless of pressure changes within a given range. For example, assume that the inlet pressure at the inlet 28 should increase or, alternatively, that the outlet pressure should decrease. In such instance, the increase in pressure P1 and the decrease in pressure P2 would result in the plunger 32 tending to move to the right as viewed in FIG. 3. The rightward movement will be opposed by the spring 34 until a new equilibrium is reached, at which time the inlet opening 28 will be eclipsed to an extent to compensate for the change in pressure so that a constant flow of material will still pass through the flow control unit. In other words, with an increased inlet pressure, a corresponding decrease in the inlet opening size will maintain a constant flow.

On the other hand, should the inlet pressure decrease or, alternatively, the outlet pressure increase, then P1 will be less and P2 will be greater with the result that the differential forces on areas A1 and A2 will be such that the spring 34 will urge the plunger 32 to the left such as depicted in FIG. 4. In this position, the openings 39 are brought into a closer registration with the inlet opening 28 so that more material may flow into the unit which, because of the decrease in pressure, will move more slowly and thus a constant flow condition is still maintained.

It will thus be evident from the foregoing that for any given setting of the needle valve head screw 36, a constant flow will be maintained regardless of pressure changes at either the inlet or outlet within given limits.

If now it should be desired to change the constant flow rate to a new constant flow rate, the operator need only change the needle valve setting. Thus, if it is desired that an increased flow take place, the needle valve 36 is unthreaded and if it is desired that a decreased flow take place, the needle valve 36 is threaded inwardly to diminish the pass through area of the valve seat structure 35.

The necessary and required exact ratios of feeding of the first and second materials through the tubes 16 and 17 to the mixing head 10 are accordingly easily controlled by the flow control units. These units themselves may be clamped to the respective storage tanks 20 and 21 as schematically depicted in FIG. 1 to facilitate the portability of the apparatus.

In accordance with important features of this invention, the flow control units are different from conventional designs. These differences are necessitated by the relatively high viscosity of the materials involved. Thus, as shown in FIGS. 3 and 4, the pressure feed back passage 38 is relatively large in order to provide a rapid response action on the plunger with respect to variations in pressures. Further, the needle valve structure is purposely formed with a blunt nose for cooperation with the valve seat 35 in order to maintain laminar flow conditions. In addition, the plunger 32 is shaved down smoothly so as not to provide too tight a fit within the cylindrical portion in the flow control unit thus enabling very high viscosity materials to be properly handled. Finally, the entrance and exit openings or ports are considerably larger than those required for low viscosity materials.

The foregoing departures in design from conventional construction constitute a difference in kind rather than degree. The viscosities of the present ingredients employed for which no flow control unit has heretofore been successfully provided, may be of the order of 25 times the viscosity of other fluids with which pressure compensated flow control units have been used. Thus radical design departures from conventional units were necessary and were discovered by experimentation.

What is claimed is:

1. A portable foaming apparatus for enabling the mixing of first and second foam materials and generation of foam therefrom directly at a site in which the foam is to be used without the necessity of mechanical mixing and sources of outside pressure, comprising, in combination: a static mixing chamber unit having a foam outlet nozzle and first and second inlets; first and second self-contained portable storage tanks having stored therein said first and second foam materials respectively; each of said tanks further including an expanding agent in the form of a soluble gas in liquid state; means imposing a sealed gas pressure in each of said tanks for expelling said materials under pressure without requiring outside pressure sources; and first and second flow control units connected between said first and second tanks and said first and second inlets, respectively, each of said flow control units providing a constant flow of its respective controlled material to said mixing chamber as the pressure of said compressed gas in said storage tanks decreases, whereby said materials are supplied to said chamber in fixed ratio and whereby said expanding agent expands to a gas in said mixing chamber unit to lather said first and second materials and effect a desired mixing thereof without mechanical agitation.

2. A portable foaming apparatus according to claim 1, in which each of said flow control units comprises a casing having inlet and outlet openings; inlet and outlet chambers in said casing communicating respectively with said inlet and outlet openings; needle valve means providing communication between said chamber; a plunger movable in said inlet chamber juxtaposed said inlet opening to vary the effective size of said inlet opening as a function of the position of said plunger; and a passage in said casing for communicating pressure in said outlet chamber to said plunger to move said plunger in a direction to vary the size of said inlet opening in such a manner as to maintain the pressure differential across said needle valve means constant whereby flow of material for any given setting of said needle valve means is held constant.

3. An apparatus according to claim 2, in which said mixing chamber includes a flushing inlet; valve means for said flushing inlet; and a source of flushing material under pressure connected to said flushing inlet.

References Cited
UNITED STATES PATENTS

| 2,513,081 | 6/1950 | Clark et al. | 117—105.5 |
|---|---|---|---|
| 2,881,794 | 4/1959 | Baldwin et al. | 137—501 |
| 3,055,596 | 9/1962 | Pope | 117—105.5 X |
| 3,120,243 | 2/1964 | Allen et al. | 137—504 |
| 3,145,730 | 8/1964 | Presnell | 137—504 X |
| 3,179,341 | 4/1965 | Plos et al. | 117—105.5 X |
| 3,236,418 | 2/1966 | Dalle et al. | 222—135 |
| 2.665.704 | 1/1954 | Kanuch | 137—501 X |

NORMAN YUDKOFF, Primary Examiner

J. SOFER, Assistant Examiner

U.S. Cl. X.R.

137—504; 222—135; 239—413; 252—359; 259—151